United States Patent

[11] 3,591,817

| [72] | Inventor | August Kunzle<br>St. Gall, Switzerland |
|---|---|---|
| [21] | Appl. No. | 882,666 |
| [22] | Filed | Dec. 5, 1969 |
| [45] | Patented | July 6, 1971 |
| [73] | Assignee | Heberlein & Co. AG.<br>Wattwil, Canton of St. Gallen, Switzerland |
| [32] | Priority | Dec. 6, 1968 |
| [33] | | Switzerland |
| [31] | | 18230/68 |

[54] HIGH SPEED MOTOR
7 Claims, 3 Drawing Figs.

[52] U.S. Cl. ................................................. 310/90,
310/157, 57/100
[51] Int. Cl. .................................................. H02k 5/16

[50] Field of Search ............................................ 310/87, 90,
157; 57/77, 100

[56] References Cited
UNITED STATES PATENTS

| 2,957,302 | 10/1960 | Lenk | 57/77 |
| 3,143,675 | 8/1964 | Hauenstein | 310/54 |
| 3,195,466 | 7/1965 | Young | 310/90 X |

Primary Examiner—D. X. Sliney
Attorney—Ward, McElhannon, Brooks and Fitzpatrick

ABSTRACT: A high speed rotary field motor with a single conical bearing wherein the rotor shaft bearing and journal are separate from the electrically and magnetically active parts of the motor.

PATENTED JUL 6 1971 3,591,817

INVENTOR.
AUGUST KUNZLE
BY
Ward McElhannon Brooks & Fitzpatrick
ATTORNEYS

HIGH SPEED MOTOR

This invention relates to electric motors, and more particularly, to rotary field motors capable of speeds of the order of 500,000 r.p.m., or more.

Drive motors, such as those used in the textile industry for texturizing continuously running synthetic textile threads by means of false-twist devices, are required to have extremely high speeds of revolution of the order of 500,000 r.p.m., for example. Such speeds require high quality drive means and bearings so that practically frictionless bearing of the rotor shaft and the twist imparter mounted on the shaft must be assured, while at the same time, oscillations of the axis of revolution must be kept to a minimum.

It is known in the textile industry to utilize a false-twist device in which the twist imparter is mounted on one end of the hollow shaft of an electric motor, both ends of which are supported by hydrostatic bearings, compressed air for which is supplied from an external source. Such devices have not proven satisfactory, essentially because the quantity of air needed for the bearings is exceedingly high and the equipment necessary for the production and introduction of the air is too expensive.

Additionally, it is known to employ floating bearings in order to support the rotating shaft in which, by means of suitably arranged bearing surfaces, such as those provided with spiral-shaped grooves, the air serving as the lubricating agent is sucked from the ambient air and compressed in order to form an air cushion. Such arrangements, however, have been intended for use in connection with rather heavy shafts rotating at a speed of the order of no more than 100,000 r.p.m., so that they are not feasible for use in connection with the rotation of light shafts which have relatively slight bearing pressure and which are required to reach far higher speeds of revolution.

Other electric motors are known in which adjacent surfaces of the relatively moveable stator and rotor are formed to provide guide surfaces for the bearings, and in this case the rotor and stator can be made of conical shape; and while it is true that such motors are intended primarily to drive shafts which carry only light loads in a direction perpendicular to the axis of rotation of the shaft, the support surfaces have no grooves for the formation of an air cushion so that the application of the high speeds of revolution required today is not feasible. This construction also embodies the disadvantage that the airgap between the stator and rotor is fixed dimensionally for electrotechnical reasons.

I have conceived a novel construction by which the foregoing difficulties and disadvantages are overcome, and by which it is possible to support the rotor shaft of a rotary field motor in such a way that maximum speeds of revolution and minimum friction between bearing surfaces are achieved.

Thus, according to my present invention, the desired results are achieved by the use of a conical bearing which, along with its journal is electrically and magnetically separated from the active parts of the rotary field motor. In practice, the motor may be a hysteresis motor, and the conical bearing may be formed with semiannular grooves separated by projections or accumulation walls preferably formed on the bearing itself. The electrical and magnetic separation is accomplished by forming the bearing and journal of a nonmagnetic material of low electrical conductivity such as titanium-aluminum alloy which also has the advantage of high mechanical resistance. By means of this arrangement, I am able to obtain the most favorable airgap in respect of the active parts of the motor, i.e. the rotor and stator on the one hand, while on the other hand I achieve the most efficient airgap between the bearing parts and with a minimum of electrical and magnetic losses.

There has thus been outlined rather broadly the more important features of the invention in order that the detailed description thereof that follows may be better understood, and in order that the present contribution to the art may be better appreciated. There are, of course, additional features of the invention that will be described hereinafter and which will form the subject of the claims appended hereto. Those skilled in the art will appreciate that the conception upon which this disclosure is based may readily be utilized as a basis for the designing of other structures for carrying out the several purposes of the invention. It is important, therefore, that the claims be regarded as including such equivalent construction as do not depart from the spirit and scope of the invention.

A specific embodiment of the invention has been chosen for purposes of illustration and description, and is shown in the accompanying drawings forming a part of the specification wherein.

Figure 1:
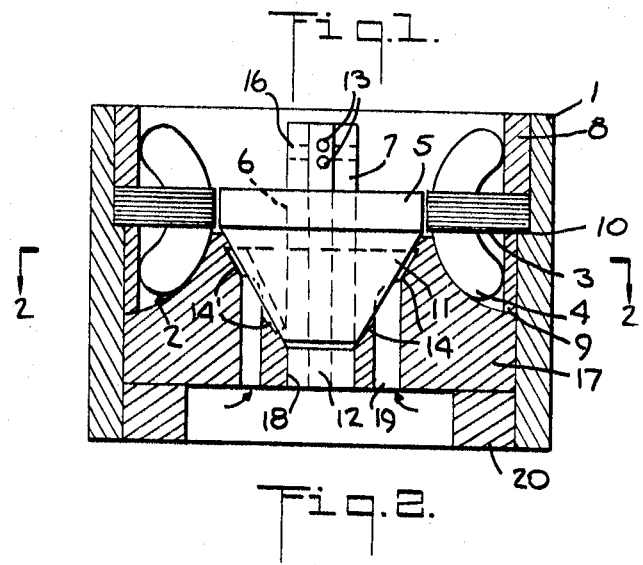
FIG. 1 is an elevational sectional view of a motor illustrating my present invention.
Figure 3:
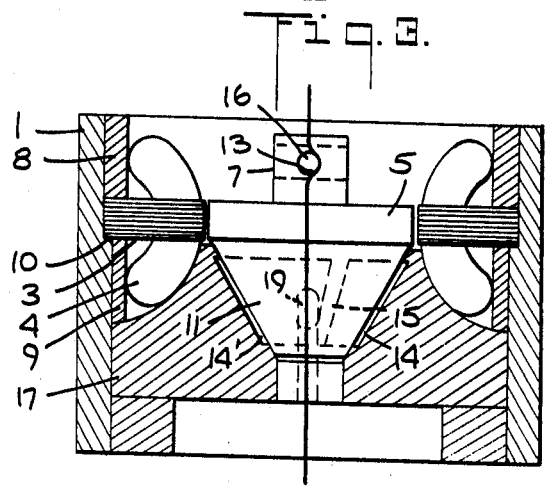
FIG. 3 is a cross-sectional view taken along the lines 3-3 of FIG. 2.

Referring now to the drawings, and particularly to FIG. 1 thereof, there is shown a hollow cylindrical casing 1 formed of steel or cast iron, or the like, in which a hysteresis motor 2 is arranged which consists of a stator formed by a pack of annular-shaped pieces of sheet iron 3 having a single or multiphase coil 4; and of a disc-shaped rotor 5. A central bore 6 is formed in the rotor 5 for fixedly receiving the rotor shaft 7; and since, in the present case, I have chosen to illustrate my invention in connection with a motor for use in the false-twisting of textile yarns, I provide a central through bore 12 in the shaft 7 and I provide a twist imparter in the form of a cross pin 16 extending diagonally across the bore 12 adjacent one end thereof. In FIGS. 1 and 3, I have illustrated a length of yarn 13 extending along through the bore 12 and wound once about the pin 16.

The position of the motor 2 is fixed in the casing 1 by means of an adjusting ring 8 and a shoulder 10 formed on the inner wall of the casing, the stack 3 being mounted on the shoulder and secured in place by the ring 8.

A conical bearing journal 11 is rigidly mounted on the shaft 7 in such a manner that its base, or larger face, bears against the lower face of the rotor 5 wherefore it is actually positioned within a correspondingly-shaped enlarged portion of a central bore 18 formed in the bearing block 17 in which I have also formed several bores 19, preferably parallel to the bore 18, and extending from the lower surface of the block 17 to the conical surface of the enlarged portion of the bore 18, all for the purpose to be described hereinafter. A spacer 9 may be used to position the bearing block 17 in respect of the stack 3 of the stator and an adjusting ring 20 threadedly engaged on the inner surface of the casing 1 below the bearing block is used to fix the same in the position established by the spacer.

Figure 2:
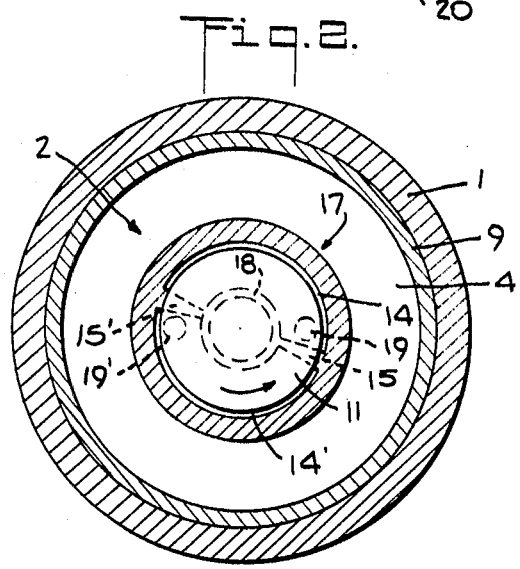
FIG. 2 is a sectional view taken along the lines 2-2 of FIG. 1.

Referring now to FIGS. 2 and 3, I have shown semiannular grooves 14 and 14' formed on the conical inner surface of the bearing block 17 and separated by the accumulation walls 15 and 15', the position of which, with respect to the grooves 14 and 14', depends on the direction of revolution. It will be understood, of course, that instead of two semiannular grooves separated by two accumulation walls, other arrangements such as quarter-annular grooves separated by four accumulation walls may be used. The bores 19 in the bearing block 17 communicate at one end with the ambient atmosphere and at the other end with the semiannular grooves 14 and 14' and draw ambient gaseous medium from beneath the bearing block and transport the same to the semiannular grooves 14 and 14' where the walls 15 and 15' permit the gas to move in one annular direction only, i.e. in the direction of rotation of the journal 11, the surface friction between it and the gas giving movement to the latter which seeps up through the active parts of the motor.

It will be noticed, that the active parts of the rotary field motor herein described are electrically and magnetically independent of the conical bearing 11 in the block 17. It is particularly important that the airgap between the rotor and the stator of the rotating field motor should be completely independent of the face of the bearing 11 and the corresponding face of the bearing block 17 so that the most favorable airgap with respect to its function may be imparted to the motor on the one hand and to the conical bearing on the other whereby each may operate at its maximum efficiency in order that maximum revolution speeds and minimum friction may be achieved.

I believe that the construction and operation of my novel motor will now be understood, and that the several advantages thereof will be fully appreciated by those persons skilled in the art.

I claim:

1. A high speed motor of the class described comprising a single conical bearing, a shaft, a journal supporting said shaft relatively to said bearing and carrying a rotor, stator means cooperating with said rotor to rotate said shaft, said bearing and journal formed of nonmagnetic material of low electrical conductivity wherefore same are substantially electrically and magnetically separated from said stator means and rotor.

2. Apparatus according to claim 1, wherein said motor is a hysteresis motor with a speed of revolution of the order of 500,000 revolutions per minute or more.

3. Apparatus according to claim 1, wherein said conical bearing is air lubricated relatively to said journal.

4. Apparatus according to claim 1, wherein an axial bore is formed in said shaft for passage therethrough of a yarn end, and a twist imparter is provided in said bore at one end thereof.

5. A high speed motor of the class described comprising a single conical bearing having a bearing face, a shaft formed with a journal having a bearing face opposite said first face and carrying a rotor, stator means cooperating with said rotor to rotate said shaft, said bearing and journal formed of nonmagnetic material of low electrical conductivity wherefore same are substantially electrically and magnetically separated from said stator means and rotor, at least one partially annular groove formed in one of said faces, and means admitting air into said groove.

6. Apparatus according to claim 5, wherein said first bearing face is formed with semiannular grooves separated by walls projecting from said conical bearing, and said bearing is bored to admit air into said grooves adjacent said walls.

7. Apparatus according to claim 5, wherein said first bearing face is formed with quarter-annular grooves separated by walls projecting from said conical bearing, and said bearing is bored to admit air into said grooves adjacent said walls.